United States Patent [19]
Kilian et al.

[11] Patent Number: 6,092,051
[45] Date of Patent: *Jul. 18, 2000

[54] SECURE RECEIPT-FREE ELECTRONIC VOTING

[75] Inventors: Joseph John Kilian, Princeton Junction, N.J.; Kazue Sako, Kanagawa, Japan

[73] Assignees: NEC Research Institute, Inc., Princeton, N.J.; NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/444,701

[22] Filed: May 19, 1995

[51] Int. Cl.$^7$ ............................... H04L 9/36; G06F 17/60
[52] U.S. Cl. ............................... 705/12; 705/74; 380/28; 380/30
[58] Field of Search ........................... 380/49, 23, 25, 380/28, 30; 395/212; 705/12, 74

[56] References Cited

U.S. PATENT DOCUMENTS

| | | | |
|---|---|---|---|
| 3,947,669 | 3/1976 | Simmons et al. | 235/156 |
| 4,641,240 | 2/1987 | Boran | 364/409 |
| 4,641,241 | 2/1987 | Boram | 364/409 |
| 4,774,665 | 9/1988 | Webb | 364/409 |
| 5,117,358 | 5/1992 | Winkler | 364/419 |
| 5,189,288 | 2/1993 | Anno et al. | 235/386 |
| 5,218,528 | 6/1993 | Wise et al. | 364/409 |
| 5,278,753 | 1/1994 | Graft, III | 364/409 |
| 5,377,099 | 12/1994 | Miyagawa | 364/409 |
| 5,400,248 | 3/1995 | Chisholm | 364/409 |
| 5,412,727 | 5/1995 | Drexler et al. | 380/24 |
| 5,495,532 | 2/1996 | Kilian et al. | 380/30 |
| 5,583,329 | 12/1996 | Davis III et al. | 235/50 A |
| 5,682,430 | 10/1997 | Kilian et al. | 380/30 |

OTHER PUBLICATIONS

Kazue Sako, "Electronic Voting Scheme Allowing Open Objection to the Tally," IEICE Trans. Fund. vol. E77–A, No. 1 1994, p. 24–30.

Niemi,. . . et al, "How to Prevent Bying of Votes in Computer Election," Advances in Cryptology ASIACRYPT '94, p. 164–170.

Brassard,. . . et al, "Minimum Disclosure Proofs of Knowledge," J. of Computer & System Sciences vol. 37, 156–189 (1988).

Bennett,. . . et al, "Quantum Crytography," Scientific American Oct. (1992), p. 50–57.

Cohen,.. et al, "A Robust & Verifiable Crytographically Secure Election Scheme," FOCS '85 p. 372–382.

Park,... et al, "Efficient Anonymous Channel and All/Nothing Election Scheme," Eurocrypt 1993, pp 248–259.

Benaloh,... et al, "Distributing the Power of a Government to Enhance the Privacy of Votes," ACM 1986, pp. 52–62.

Benaloh,... et al, Receipt–Free Secret–Ballot Elections, ACM 1994, pp 544–553.

(List continued on next page.)

*Primary Examiner*—Tod R. Swann
*Assistant Examiner*—Hrayr A. Sayadian
*Attorney, Agent, or Firm*—Philip J. Feig; Andrew G. Isztwan

[57] ABSTRACT

A number-theoretic based algorithm provides for secure receipt-free voting. A vote generating center generates a choice of votes for each voter or vote chooser. The votes are encrypted, shuffled, and conveyed to a vote chooser along with information regarding how the votes were shuffled without being intercepted en route. The information is preferably sent along untappable secure channels. The method can incorporate validation of generation and shuffling of the votes using chameleon commitment and interactive proofs. The invention can be realized by current-generation personal computers with untappable channels and access to an electronic bulletin board.

21 Claims, 5 Drawing Sheets

OTHER PUBLICATIONS

Sako...et al, "Secure Voting Using Partially Compatible Homomorphisms,"Advances in Cryptology, Crypto 1994, pp 411–424.

Franklin et al, "Communication Complexity Secure Computation," ACM 1992, pp 699–710.

Boyar et al, "Subquadratic Zero–knowledge," IEEE 1991, pp 69–78.

Charem, David L., "Ultraceable Electronic Mail Return Address and Digital Psuedonyms," ACM 1981, pp 84–88.

Sako et al, "Receipt–Free Mix–Type Voting Scheme" Proceeding Advances in Cryptology, Eurocrypt 1995, pp. 393–403.

Kurosawa... et al, "Multi–Language Zero Knowledge Interactive Proof Systems," Advances in Cryptology Crypto 1990, pp 339–351.

Kilian, "A Note on Efficient zero–knowledge proofs and arguments," ACM 1992, pp. 723–732.

Fiat et al, "How to move yourself: Practical Solutions to Identification and Signature Problems," Advances in Cryptology, Eurocrypt '86 pp. 186–194.

J.C. Benaloh et al, "Receipt–free Secret–ballot Election," STOC '94, pp. 544–553 (1994).

Niemi et al, "How to prevent buying of votes in computer elections," ASIACRYPT '94, pp. 141–148 (1994).

C. Bennett et al, "Quantum Cryptography," Scientific American, vol. 267, No. 4, pp. 50–57 (Oct. 1994).

C. Park et al, "Efficient Anonymous Channel and All/Nothing Election Scheme," Advances in Cryptology, Eurocrypt '93, pp. 248–259, 1993.

Brassard et al, "Minimum Disclosure Proofs of Knowledge," JCSS, pp. 156–189, 1988.

SECURE RECEIPT-FREE ELECTRONIC VOTING

FIELD OF THE INVENTION

The present invention relates to a method and apparatus useful for secure receipt-free electronic voting and specifically, to number-theoretic based algorithms for secure receipt-free electronic voting.

BACKGROUND OF THE INVENTION

The ultimate goal of secure electronic voting is to replace physical voting booths. Achieving this goal requires work both on improving the efficiency of current protocols and understanding the security properties that these physical devices can provide.

Recently, it is observed in an article by J. C. Benaloh et al, entitled "Receipt-free Secret-ballot Election," in STOC 94, pp. 544–553 (1994), that unlike physical voting protocols, nearly all electronic voting protocols give the voters a receipt by which they can prove how they voted. Such receipts provide a ready means by which voters can sell their votes or by which another party can coerce a voter to vote in a certain way.

Benaloh and Tuninstra give the first receipt-free protocol for electronic voting. In their scheme a trusted center generates for each voter a pair of ballots consisting of a "yes" vote and a "no" vote in random order. Using a trusted beacon and a physical voting booth the center proves to the public that the ballot indeed includes a well-formed (yes/no) or (no/yes) pair and at the same time proves to the verifier which pair it is. The physical apparatus ensures that by the time the verifier is able to communicate with an outsider, the verifier can forge a proof that the ballot is (yes/no) and also forge a proof that it is (no/yes). Thus, such a proof ceases to provide either proof as a receipt.

Independently, Nieni and Renvall tried to solve this problem in an article by Niemi et al, entitled "How to prevent buying of votes in computer elections" in ASIA-CRYPT '94, pp. 141–148 (1994). They also use a physical voting booth where a voter performs multiparty computation with all the centers.

Both the Benaloh-Tuinstra and the Niemi-Renivall protocols illustrate that receipt-free secure voting is possible. However, their physical requirements are fairly cumbersome, and are not unlike those faced by participants in physical elections. An important open question is precisely what physical requirements are necessary for achieving receipt-free secure voting.

In accordance with the teachings of the present invention, a secure receipt-free voting scheme is described with a more practical physical requirement, that is the existence of a physically secure untappable private channel.

SUMMARY OF THE INVENTION

A secure receipt-free voting scheme is described where each voter does not leave evidence of how the voter voted by using a physically secure untappable channel. The term "secure untappable channel" refers to the fact that a message can be sent from a center without being accessed or detected by another party. Such an intappable channel is described in an article by C. Bennett et al entitled "Quantum Cryptography" in Scientific American, vol. 267, no. 4, Oct. 1992, pp. 50 to 57. The end result of using an untappable channel is that neither the voter nor another party can show or prove how a vote was cast or what was the message that was sent. Once a message is sent or received, the content may be changed rendering proof of the message impossible. However, if the message is intercepted or detected in route or at the time of reception, the intercepting or detecting party can learn the content of a message prior to a time when a change was possible. Moreover, even if a non-secure channel is used, if the message travels along the channel without interruption or detection, by virtue of the protocol used in the present invention, determination of a particular vote after receipt at its destination is not possible. In other words, an untappable channel refers to the transmission of a message without interception or detection in route.

In the following description, the term 'chameleon commitments' is used. A chameleon commitment is a message committing and decommiting protocol, where the cormitter can decommit as the coamitter committed, while the receiver can decomoit in any way, regardless of how the committer committed.

In accordance with the method of the present invention, there is a vote generating center, a vote counting center, and shuffling centers to transfer messages between the various centers and each voter. The method comprises the following three steps.

The first step is the generation by a voter generating center of a set of all possible votes for each voter. For simplicity, it will be assumed that the possible votes are two, namely 1-vote and 0-vote. For each voter i, the vote generating center posts encrypted 1-votes and 0-votes in random order. The committer commits to the ordering using chameleon bit commitments. The enter proves that the committer constructed the vote-pairs properly. The committer decommits the ordering only to the voter through an secure untappable channel.

The second step is the transferring the vote from the vote generating center to the voter via the shuffling centers. Each shuffling center shuffles the two votes for voter i through a shuffle-net. The committer commits with regard to how the votes are shuffled using chameleon commitments. Each shuffling center proves the correctness of its action. The committer reveals how the votes were shuffled only to the voter s through an untappable secure channel.

The second step is not mandatory, in which case the vote generating center may directly send the vote to the voter through an ordinary channel.

The third step is anonymous voting by the voter. By keeping track of the initial ordering of the pair, and how they were shuffled during the second step, each voter knows which vote is which. Each voter submits one of the received votes to the counting center through a secure anonymous channel. Then the counting center tallies the votes.

Implementation of a secure anonymous channel can be found in an article by C. Park et al entitled "Efficient Anonymous Channel and All/Nothing Election Scheme" in Advances in Cryptology, Eurocrypt '93, 1993, pp. 248 to 259, or in pending U.S. patent application Ser. No. 08/376,568 now entitled U.S. Pat No. 5,632,430 entitled "Secure Anonymous Message Transfer and Voting Scheme" which is assigned to the same assignees as the present invention. Also, the invention results in a method which reduces the amount of communication and computation necessary to generate, transmit and check the proofs by combining multiple proofs into a single proof.

The present invention will be best understood when the following description is read in conjunction with the accompanying drawing.

DETAILED DESCRIPTION OF THE INVENTION

A preferred embodiment of a secure receipt-free voting scheme comprising the present invention will now be described with reference to FIGS. 1 and 2. In accordance with the scheme, the encrypted votes generated by vote generating center 10 by vote construct process 26 are posted on an electronic bulletin board 13 or other publicly accessible messaging means. The encrypted votes are pairs of 1-votes and 0-votes, permuted in random order, for each vote chooser 12($i$). Then the vote generating center 10 secretly conveys to the vote chooser 12($i$) through an untappable channel 16($i$) how the encrypted votes for vote chooser 12($i$) is ordered. At the same time, the vote generating center 10 needs to prove to the public that the vote was honestly generated and to the vote chooser that the center 10 had not sent false information in the secret message. These proofs are achieved by following prove process 20 as will be described below.

The vote chooser 12($i$) chooses its ballot using the secret message from the vote generating center 10 through a physically untappable channel 16($i$). The vote chosen by the vote choosers 12(1), 12(2), . . . 12($t$) are transferred anonymously through a secure anonymous channel 18 to a vote counting center 15. The secure anonymous channel can be realized by the mixing centers 14(1), 14(2), . . . 14($n$), where encrypted votes are successively processed by the mixing centers until the vote counting center 15 provides as its output a randomly, untraceably ordered set of unencrypted votes and the outcome of the tally. Each vote generating center 10, vote chooser 12($i$), mixing center 14($i$) and vote counting center 15 comprises a computing means, preferably a personal computer but it may also be a workstation or the like.

Having set forth an overview of the scheme, the detail of vote construct process 26, prove process 20, and the information being transferred securely through untappable channel 16($i$) will now be described.

The vote generating center 10, by executing vote construct process 26, generates an encrypted pair of 0-vote and 1-vote for each vote chooser 12($i$). The center follows the vote construct process for each vote chooser 12($i$) with independently chosen random numbers.

The encrypted form of 1-votes and 0-votes need to be appropriate for input to the anonymous channel. Preferably, the method and apparatus described in U.S. patent application Ser. No. 08/376,568 , now U.S. Pat. No. 5,632,430, which is incorporated herein by reference, is used and the encrypted forms of 1-votes and 0-votes are selected to be:

$$V_i^0 = (g^{r_{i1}} \bmod p, m_0 \cdot y^{r_{i1}} \bmod p)$$

$$V_i^1 = (g^{r_{i2}} \bmod p, m_1 \cdot y^{r_{i2}} \bmod p) \quad (1)$$

for independent random numbers of $r_{i1}$ and $r_{i2}$ for vote choose 12($i$) and appropriately chosen common constants p, g, y, $m_0$ and $m_1$ for all vote choosers. The vote construct process 26 comprises calculating the above formulas with randomly chosen numbers $r_{i2}$ and $r_{i2}$.

The vote generating center 10 posts on the bulletin board in the order of $(v_i^0, v_i^1)$ with probability of one half and $(v_i^0, v_i^0)$ otherwise.

The prove process 20 comprises three algorithms: commitment 21, prove 1-0 22, and decommitment 23. The algorithm commitment 21 is used to calculate and post a chameleon commitment of the above ordering and a random sequence used in the succeeding prove 1-0 protocol. The algorithm prove 1-0 is executed multiple times to prove that the center 10 generated the votes honestly, and the output is posted on bulletin board 13. The algorithm decommitment 23 is used to decommitment the chameleon commitment committed in algorithm commitment 21, through an untappable secure channel. The specific algorithms of prove 1-0 and chameleon commitment/decommitment will be described below.

The vote generating center sends an output of a decommitter, which is a chameleon decommitment, to the vote chooser 12($i$) in through the untappable channel.

The vote chooser 12($i$) verifies the correctness of the prove 1-0 algorithm and the validity of decommitments by verification process 24. If the correctness and validity are verified, the vote chooser 12($i$) follows selection process 25 and chooses either one of the encrypted votes on the bulletin board, which expresses its opinion. The vote chooser is able to choose correctly because it would know how the encrypted votes w ere ordered from the chameleon decommitment.

The vote chosen by the vote chooser 12($i$) will be input to a shuffle-net, together with other votes chosen by the other vote choosers.

Applying the scheme described above, a malicious party who coerces the vote chooser 12($i$) to disclose its vote, will not receive a concrete proof of whether the chosen vote was a 1-vote or a 0-vote unless the vote generating center 10 is allowed to disclose the vote or the secure untappable channel 16($i$) is tapped into.

The algorithms prove 1-0 and chameleon commitment/decommitment will now be described, The prove 1-0 algorithm involves a prover and a verifier. The prover is the vote generating center in this case. The verifier may be any entity, including vote choosers. The probabilistic behavior of the algorithm will be determined termed by an output of a suitable hash function, but it may also be a random beacon.

The algorithm comprises, given randomly permuted pair of $(v_i^0, v_i^1)$ generated and posted as equations (1), showing that they are indeed a pair of 1-vote and 0-vote. Assume a random string has been committed using a chameleon commitment to the vote chooser.

prove 1-0

1 The prover uniformly chooses r', r" and calculates i $E_0(v^0) = (g^{r'} \bmod p, m_0 \cdot y^{r'} \bmod p)$ i $E_1(v^1) = (g^{r''} \bmod p, m_1 \cdot y^{r''} \bmod p)$ and posts $E_0(v^0)$, $E_1(v^1)$ in the order according to the committed string.

2a. With probability ½, the prover is asked to reveal r' and r". The verifier checks if $E_0(v^0)$, $E_1(v^1)$ is made consistently.

2b. With probability ½, the prover is asked to reveal $s1 = r_{i1} - r'$ and $s2 = r_{i2} - r''$. The verifier checks that $v_i^0$ and $v_i^1$ can be indeed generated from $E_0(V^0)$, $E_1(v^1)$ using s1, s2, g and y.

The chameleon commitment scheme will now be described. The chameleon commitment scheme involves a sender and a receiver. The sender is the vote generating center in this case. The receiver are the vote choosers.

The following is explained in terms of committing a single bit, 0 or 1, but can be easily transformed to commit multiple bits and strings. In the scheme, the receiver is assumed to know a satisfying $\alpha = g^a$ for public integer $\alpha$.

Commitment Sender commits 0 by $g^r$ and $\alpha \cdot g^r$ for 1 to the receiver.

Decommitment Sender reveals r. The receiver calculates both $g^r$ and $\alpha \cdot g^r$ and determines what was the committed bit.

In order to modify the decommitment, the receiver may claim it received $r-\alpha$ instead of r, which is the case when the sender committed the other value.

A more detailed description of chameleon commitments can be found in article "Minimum Disclosure Proofs of Knowledge" by Brassard, Chaum and Crépeau in JCSS, pages 156–189, 1988.

After the vote generating center decommitted its random string, the vote chooser 12(i) may follow with invalidation process 27 to invalidate the commitment of the center. The invalidation process 27 comprises informing the center of the value $\alpha$, so that the center also has the ability to provide false information afterwards, or to post the value a on a bulletin board 13.

To make sure that the vote chooser has the ability to modify the commitments, that is, the vote chooser knows the value $\alpha$, the interaction may occur (1) between the vote generating center and each vote chooser, (2) before the commitment is applied, or (3)even before the start of voting. For example, the vote choosers may execute a cut-and-choose protocol to pick the constant $\alpha$ so that the vote chooser knows a with high probability.

Figure 3:
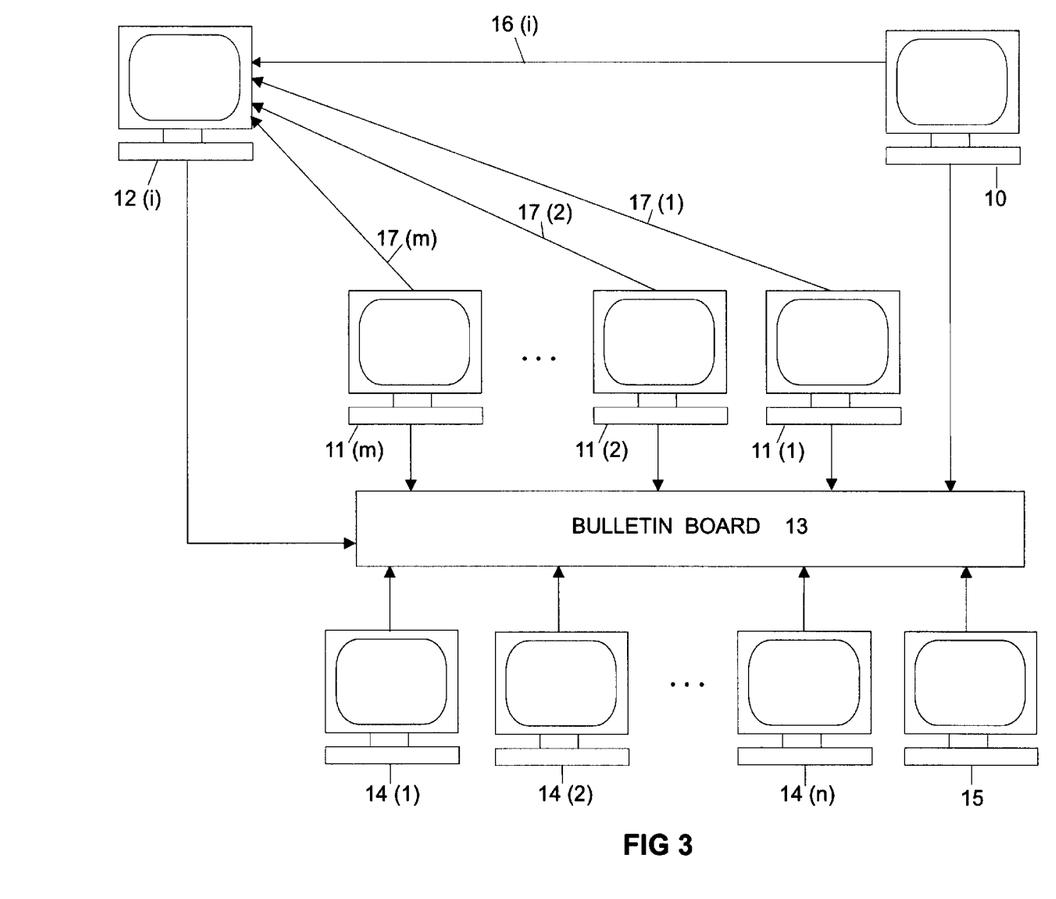
FIG. 3 is a schematic illustration of a preferred embodiment for practicing the present invention with shuffling centers.
Figure 4:
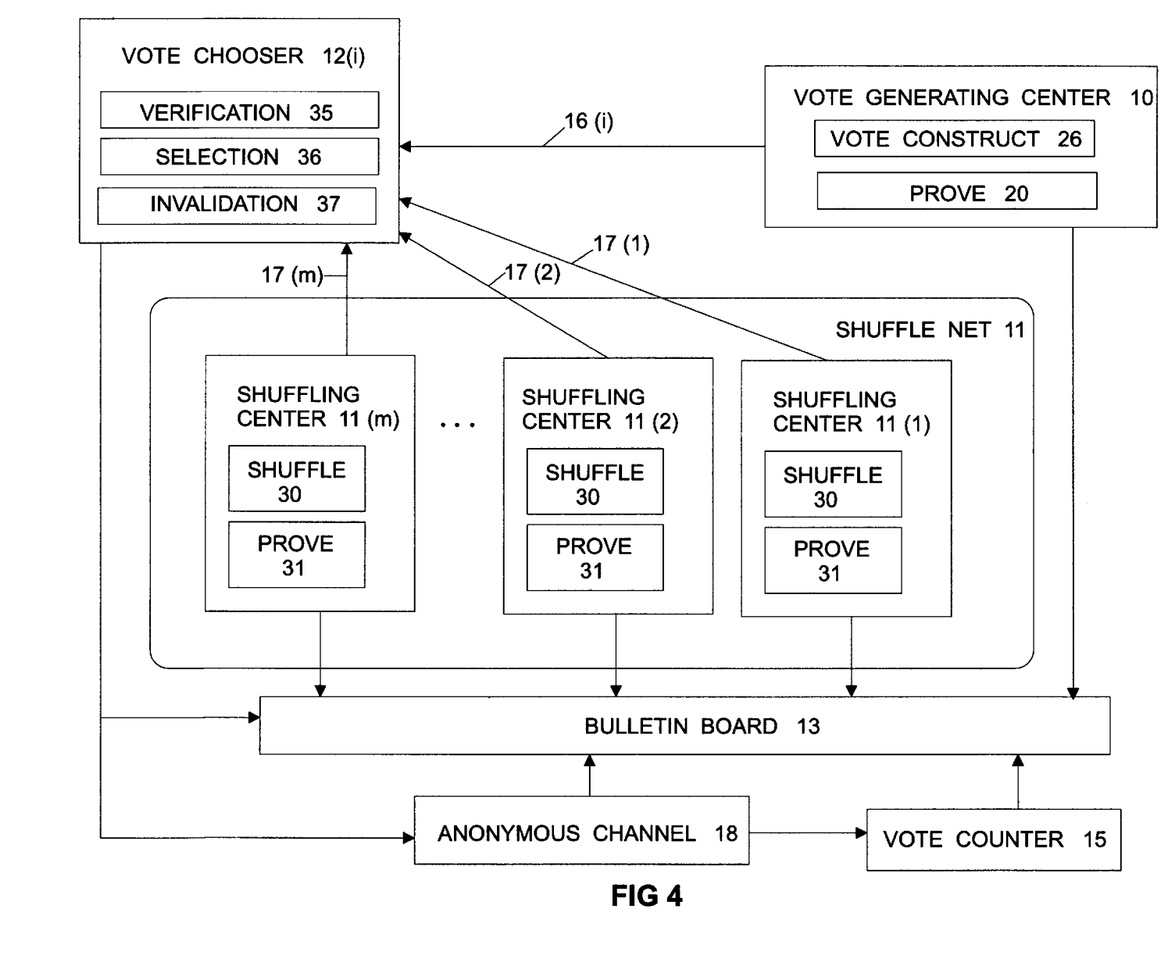
FIG. 4 is a schematic illustration of a message flow with shuffling centers.

In order to make the receipt-free property more secure, it is possible to incorporate a shuffle net 11 comprising multiple shuffling centers 11(1), 11(2), . . . 11(m), as shown in FIGS. 3 and 4. Each encrypted vote generated by vote generating center 10 for vote chooser 12(i) is passed through shuffle net 11 before reaching the vote chooser 12(i). As a result of so doing, a malicious party would not be able to determine how the vote chooser 12(i) voted unless it colluded with all the shuffling centers and vote generating centers, or wiretapped every secret channel 17(1), 17(2), . . . 17(m) between the shuffling centers and the vote chooser 12(i).

Each vote shuffling center comprises a computing means, preferably a personal computer but it may also be a workstation or the like.

The operation of the shuffle net and shuffling centers will now be described. Shuffling center 11(j) processes each message posted by the previous shuffling center 11(j−1) (or the vote generating center 10, when j=1) and posts the results of process shuffle 30 (FIG. 5) in permuted order until the last shuffling center 11 (m) posts the result of the shuffling. Each shuffling center conveys how the votes were shuffled to the vote chooser through an secure untappable channel 17(j). Each shuffling center proves it shuffled honestly and did not provide false information to the vote chooser in a manner similar to that of the vote generating center. This is achieved through executing process prove 31.

Figure 5:
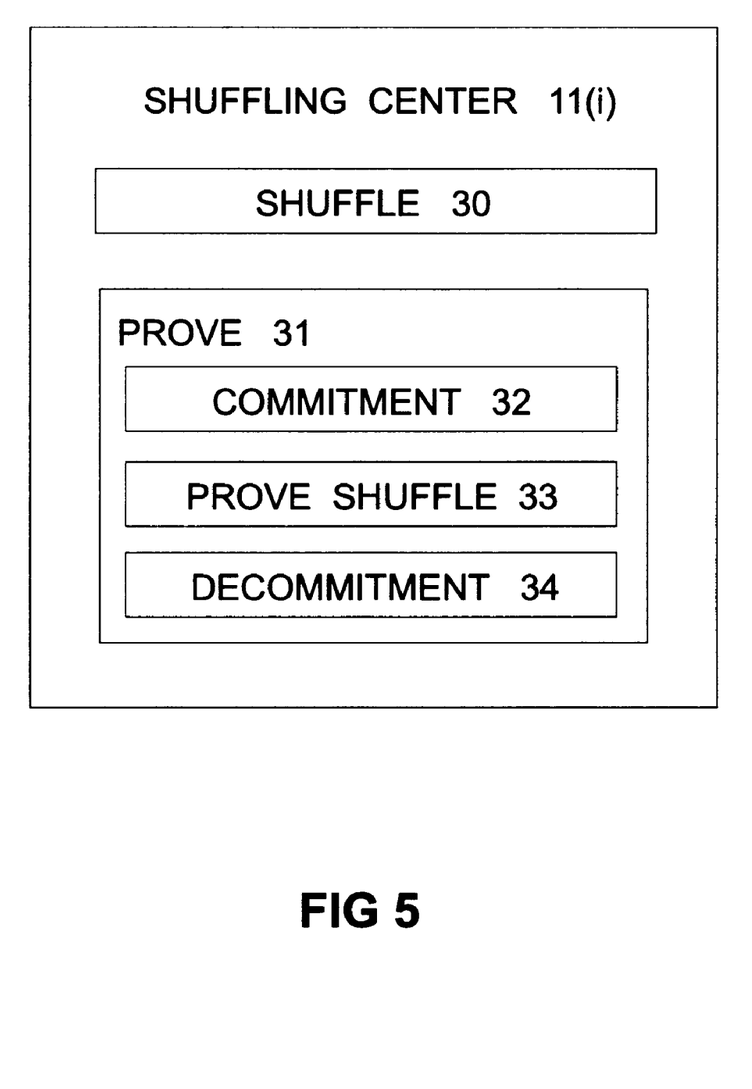
FIG. 5 is a schematic illustration of a shuffling center.

FIG. 5 illustrates the operation of a shuffling center 11(i). The shuffling center 11(i) executes the processes shuffle 30 and prove 31 and posts the outputs. The process prove 31 comprises an algorithm commitment 32 which chameleon commits the random string to the vote chooser.

The process prove 31 comprises three algorithms: commitment 32, prove shuffle 33, and decommitment 34.

In order to describe the process shuffle 30, let the input be encrypted shuffled votes, which are presented as:

$$X_1 = (A_1, A_2)$$

$$X_2 = (B_1, B_2)$$

The algorithm shuffle comprises generating a random number $c_1$ and $c_2$ and shuffling the encrypted votes $X_1$ and $X_2$ as $$S(X_1) = (A_1 \cdot g^{C1} \bmod p, A_2 \cdot Y^{C1} \bmod p)$$

$$S(X_2) = (B_1 \cdot g^{C2} \bmod p, B_2 \cdot Y^{C2} \bmod p) \quad (2)$$

and posting $S(X_1)$ and $S(X_2)$ in random order.

This order and a random sequence to be used in the algorithm prove shuffle 33 are committed using chameleon commitment and are posted on the bulletin board as the output of algorithm commitment 32.

The algorithm prove shuffle 33 is used to prove that the shuffling center executed the algorithm shuffle correctly. The prove-shuffle algorithm involves a prover and a verifier. The prover is the shuffling center in this case. The verifier may be any entity, including a vote chooser. The probabilistic behavior of the algorithm will be determined by an output of a suitable hash function, but it may also be a random beacon. The algorithm comprises a permuted pair of $(S(X_1), S(X_2))$, showing that they are indeed generated from inputs $X_1$ and $X_2$ as equations (2). Assume a random string has been committed using chameleon commitment to the vote chooser.

prove shuffle

1. The prover uniformly chooses c', c" and calculates $$E(X_1) = (A_1 \cdot g^{C'} \bmod p, A_2 \cdot y^{C'} \bmod p)$$

$$E(X_2) = (B_1 \cdot g^{C''} \bmod p, B_2 \cdot y^{C''} \bmod p)$$

post $E(X_1)$, $E(X_2)$ in the order according to the committed string.

2a. With probability ½, the prover is asked to reveal c' and c". The verifier checks if $E(X_1)$, $E(X_2)$ is made consistently.

2b. With probability ½, the prover is asked to reveal $t_1 = c_1 - c'$ and $t_2 = C_2 - C''$. The verifier checks that $E(X_1)$ and $E(X_2)$ can indeed be generated from $S(X_1)$, $S(X_2)$ using $t_1$; $t_2$, g and y.

The encrypted votes posted by the vote generating centers are successively processed by the shuffling centers 11(1), 11(2) , . . . 11(m) until the last center provides as its output a randomly, untraceably ordered set of encrypted votes for each vote chooser.

The vote chooser 12(i) chooses its ballot using the secret messages from the vote generating center and shuffling centers through secure untappable channels 16(i), 17(1),17 (2) , . . . and 17(m).

Invalidation of chameleon commitments of shuffling centers can be realized in a similar manner as invalidated commitments of a vote generating center.

Having described a preferred method of practicing the present invention, preferred embodiments useful for practicing the invention will now be described.

Figure 1:
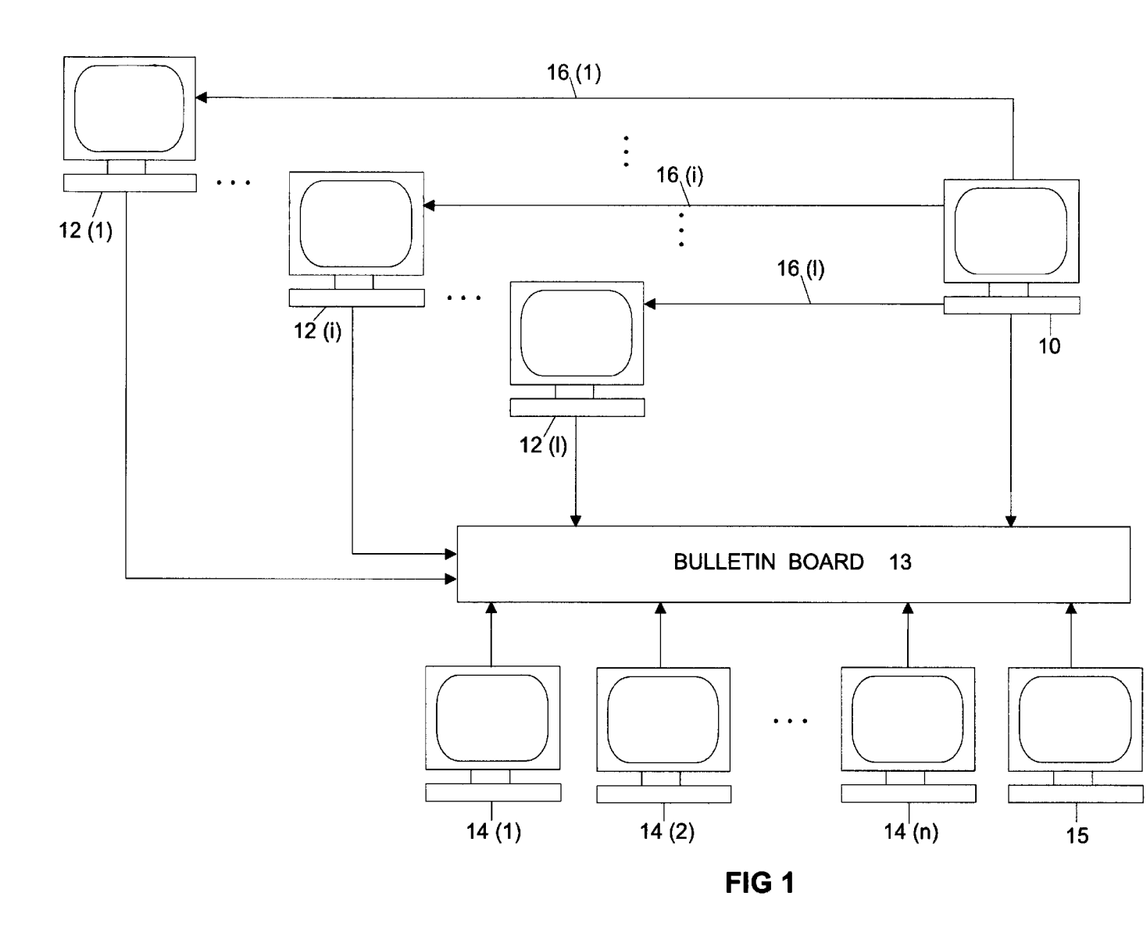
FIG. 1 is a schematic illustration of a preferred embodiment for practicing the present invention.

FIG. 1 schematically illustrates a preferred embodiment for practicing the invention. The vote generating center 10, vote choosers 12(1), 12(2) , . . . 12(t), mixing centers 14(1), 14(2), . . . 11(n) and vote counting center 15 use personal computers or workstations connected to a conventional electronic bulletin board 13. There are secure untappable channels 16(1),16(2) . . . 16(t) so that the vote generating center can send a secret message to each vote chooser. All elements (senders, verifiers, centers and the like) comprising the message transfer process interact by posting messages to and receiving messages from the bulletin board 13, except when the vote generating center sends decommitting messages to vote choosers via untappable channels 16(1), 16(2) ... 16($t$). The vote generating center or vote choosers or vote counting center can also serve as mixing centers or vote counting centers. The personal computers either contain software to perform the method described above or alternatively contain in hardware or software embodiments of the elements described in FIG. 2.

Figure 2:
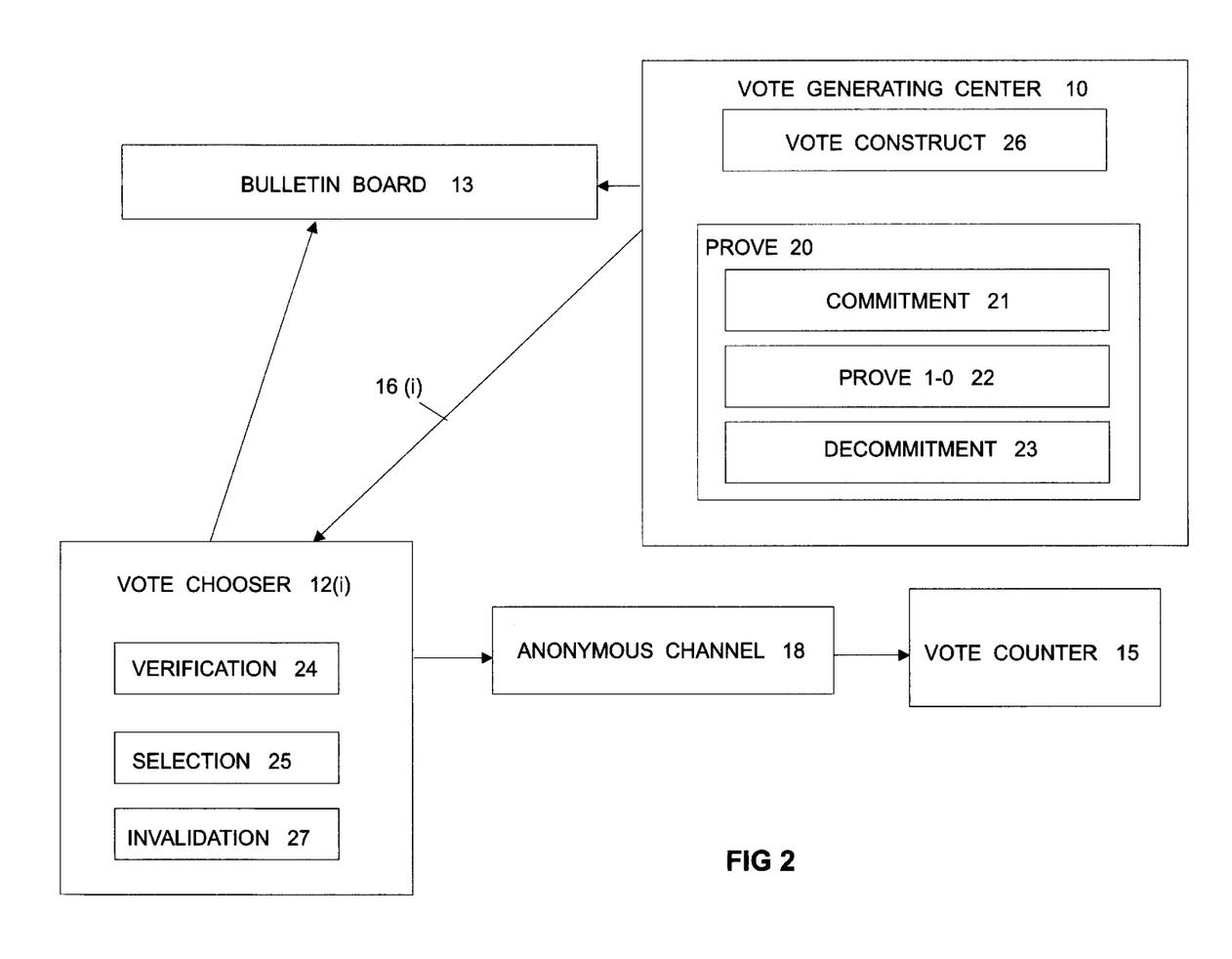
FIG. 2 is a schematic illustration of message flow.

FIG. 2 illustrates how messages are transferred to achieve receipt-free voting. For each vote chooser 12($i$), vote generating center 10 generates encrypted votes using a vote constructor 26 as described above. The vote generating center then follows process prove 20 which comprises algorithms commitment 21, prove 1-0 22 and decommitment 23. The output of decommitment 23 is sent to vote chooser 12($i$) through untappable channel 16($i$). Other outputs of the vote generating center 10 are posted on the bulletin board 13. The vote chooser 12($i$) follows the processes verification 24 and selection 25, and outputs selected votes from the encrypted votes on the bulletin board. The selected votes of all the vote choosers 12(1), 12(2) ... 12($t$) are anonymously transferred to vote counter 15 through anonymous channel 18.

FIG. 3 schematically illustrates a preferred embodiment for practicing the invention with a shuffle net. The vote generating center 10, vote shuffling centers 11(1), 11(2), ... 11($m$), vote choosers 12(1), 12(2), ... 12($t$), mixing centers 14(1), 14(2), ... 11($n$) and vote counting center 15 use personal computers or workstations connected to a conventional electronic bulletin board 13. There are untappable channels 16(1),16(2) ... 16($t$) so that the vote generating center can send a secret message to each vote chooser. There are also untappable channels 17(1),17(2) ... 17($m$) so that the shuffling centers 11(1), 11(2), ... 11($m$) can send a secret message to vote chooser 12($i$). All elements (senders, verifiers, centers and the like) comprising the message transfer process interact by posting messages to and receiving messages from the bulletin board, except for the vote generating center or shuffling centers which send decommitting messages to a vote chooser via untappable channels. The vote generating center or vote choosers or vote counting center or shuffling centers can also serve as mixing centers or vote counting centers or shuffling centers. The personal computers either contain software to perform the method described above or alternatively contain in hardware or software embodiments the elements described in FIGS. 4 and 5.

FIG. 4 illustrates how messages are transferred to achieve receipt-free voting with a shuffle net. For each vote chooser 12($i$), vote generating center 10 generates encrypted votes which are posted on the bulletin board 13. Then shuffling center 11(1) reads encrypted votes from the bulletin board 13 and follows processes shuffle 30 and prove 31, and output shuffled votes to the bulletin board 13, while sending a decommitting message to vote chooser 12($i$) through untappable channel 17(1). Similarly, the succeeding shuffling centers read the preceding centers output from bulletin board 13, and post its output to the bulletin board for the next shuffling center, while sending its decommitting message to vote chooser 12($i$) through untappable channel 17($j$). The last shuffling centers output will be read by the vote chooser 12($i$), which follows the processes verification 35 and selection 36, and outputs selected votes from the encrypted votes on the bulletin board. The selected votes of all the vote choosers 12(1), 12(2) ... 12($t$) are anonymously transferred to vote counter 15 through anonymous channel 18.

FIG. 5 schematically illustrates a shuffling center 11($i$). The shuffling center follows process shuffle 30 and process prove 31. Process prove 31 comprises algorithms commitment 32, prove shuffle 33 and decommitment 34.

While there has been described and illustrated a preferred method and apparatus of secure receipt free electronic voting, it will be apparent to those skilled in the art that variations and modifications are possible without deviating from the broad teachings and spirit of the present invention which shall be limited solely by the scope of the claims appended hereto.

What is claimed is:

1. A computer implemented method of secure receipt-free voting, the method comprising the steps of:

(a) constructing ballots at at least one vote generating center for each vote chooser, each ballot having a value;

(b) posting the ballots on a bulletin board;

(c) proving that the ballots are correctly constructed without generally revealing the values of the ballots:

(d) sending at least one private message from the vote generating center to each of the vote choosers without the at least one private messages being intercepted, the at least one private message revealing and proving to each vote chooser the values of the ballots from which that vote chooser may choose to vote;

(e) permitting each vote chooser to create an alternative message based upon the at least one private message received by that vote chooser, the alternative message not being indicative of the correct values for the ballots revealed and proven to that vote chooser;

(f) each vote chooser choosing a ballot from the revealed and constructed ballots indicative of a chosen vote;

(g) preventing proof of the value of the chosen ballot to a malicious party by rendering computationally infeasible a determination by the malicious party of whether the vote generating center sent the at least one private message actually received by the vote chooser or the alternative message regardless of any information provided by the vote chooser to the malicious party at any time, (h) the vote chooser specifying the ballot chosen by the vote chooser to a vote counting center through a secure anonymous channel; and (i) counting, the ballots specified by all vote choosers to the vote counting center.

2. The method of secure receipt-free voting of claim 1, wherein proving that the ballots are correctly constructed is performed by executing algorithm prove 1-0, given encrypted forms of 1-votes and 0-votes as $v_i^0 = (g^{r_{i1}} \bmod p, m_0 \cdot y^{r_{i1}} \bmod p)$ and $v_i^1 = (g^{r_{i2}} \bmod p, m_1 \cdot y^{r_{i2}} \bmod p)$, and a string which has been committed using chameleon commitment to the vote chooser, then a prover uniformly chooses r', r" and calculates $$E_0(v^0) = (g^{r'} \bmod p, m_0 \cdot y^{r'} \bmod p)$$

$$E_1(v^1) = (g^{r''} \bmod p, m_1 \cdot y^{r''} \bmod p)$$

and posts $E_0(v^0)$, $E_1(v^1)$ in the order according to the committed string, then with probability ½, the prover is asked to reveal r' and r" and the vote chooser checks if $E_0(v^0)$, $E_1(v^1)$ are made consistently and with probability ½, the prover is asked to reveal $s1 = r_{i1} - r'$ and $s2 = r_{i2} - r''$ and the vote chooser checks that $v_1^0$ can be generated from $E_0(v^0)$ $E_1(v^1)$ using s1, s2, g and y.

3. The method of secure receipt-free voting of claim 1, further comprising the steps of:

(i) committing a random string using chameleon commitments, wherein for each bit, 0 or 1, the respective vote choosers know the value a satisfying $\alpha=g^a$ for public integer $\alpha$, and a 0-bit is committed by $g^r$ and a 1-bit is committed by $\alpha \cdot g^r$;

(k) proving the correctness of the constructed ballots by using the committed bits; and (l) decommiting through transmission without interception wherein decommiting is performed by revealing the value r and the vote chooser calculating both $g^r$ and $\alpha \cdot g^r$ and determining what was the committed bit.

4. The method of secure receipt-free voting of claim 3, wherein proving that the ballots are correctly constructed is performed by executing the algorithm prove 1-0 given encrypted forms of 1-votes and 0-votes as $v_i^0(g^{r_{i1}} \bmod p, m_0 \cdot y^{r_{i1}} \bmod p)$ and $v_i^1 = (g^{r_{i2}} \bmod p, m_1 \bmod p)$, and a random string which has been committed using chameleon commitment to the vote chooser, then a prover uniformly chooses r', r" and calculates $$E_0(v^0) = (g^{r'} \bmod p, m_0 \cdot y^{r'} \bmod p)$$

$$E_1(v^1) = (g^{r'} \bmod p, m_1 \cdot y^{r'} \bmod p)$$

and posts $E_0(v^0)$, $E_1(v^1)$ in the order according to the committed string, then with probability ½, the prover is asked to reveal r' and r" and the vote chooser checks if $E_0(v^0)$, $E_1(v^1)$ are made consistently and with probability ½, the prover is asked to reveal $s1 = r_{i1} - r'$ and $s2 = r_{i2} - r"$ and the vote chooser checks that $v_i^0$ and $v_i^1$ can be generated from $E_0(v^0)$, $E_1(v^1)$ using s1, s2, g and y.

5. The method of secure receipt-free voting of claim 3, wherein step (a) further comprises:

(i) shuffling the constructed votes; and (ii) sending a private message about a respective shuffling to the vote chooser without being intercepted.

6. The method of secure receipt-free voting of claim 1, where in step (a) further comprises:

(i) shuffling the constructed votes; and (ii) sending a private message about a respective shuffling to the vote chooser without being intercepted.

7. The method of secure receipt-free voting of claim 6, wherein sending the private message about the respective shuffling comprises sending without interception.

8. The method of secure receipt-free voting of claim 6, further comprising the step of proving the correctness of the shuffling of the constructed ballots.

9. The method of secure receipt-free voting of claim 8, further comprising the steps of:

(i) committing a random string using chameleon commitments wherein for each bit 0 or 1 the respective vote choosers know the value a satisfying $\alpha=g^a$ for public integer $\alpha$, and a 0-bit is committed by $g^r$ and a 1 bit is committed by $\alpha \cdot g^r$;

(k) proving the correctness of shuffling of the constructed ballots using the committed bits; and (h) decommiting without being intercepted wherein decommiting is performed by revealing the value r and the vote chooser calculating both $g^r$ and $\alpha = g^r$ and determining what was the committed bit.

10. The method of secure receipt-free voting of claim 9, wherein said proving the correctness of the shuffling is performed by executing the algorithm prove shuffle wherein the algorithm is performed by uniformly choosing c', c" and calculating $E(X_1) = (A_1 \cdot g^{c'} \bmod p, A_2 y^{c'} \bmod p)$ and $E(X_2) = (B_1 \cdot g^{c'} \bmod p, B_2 \cdot Y^{c''} \bmod p)$ and posting $E(X_1)$ and $E(X_2)$ in order according to a committed string, then with probability ½ revealing c' and c" and checking if $E(X_1)$, $E(X_2)$ is consistent, then with probability ½, revealing $t_1 = c_1 - c'$ and $t_2 = C_2 - C"$ and checking that $E(X_1)$ and $E(X_2)$ can be generated from $S(X_1)$, $S(X_2)$ using $t_1$, $t_2$, g and y, wherein $S(X_1) = (A_i \cdot g^{c1} \bmod p, A_2 \cdot y^{c1} \bmod p)$ and $S(X_2) = B_1 \cdot g^{c2} \bmod p, B_2 \cdot y^{c2} \bmod p)$, wherein encrypted shuffle votes $X_1 = (A_1, A_2)$ and $(X_2 = (B_1, B_2)$.

11. The method of secure receipt-free voting of claim 9, further comprising invalidating the chameleon commitments.

12. The method of secure receipt-free voting of claim 11, wherein invalidating the chameleon commitments includes providing a secret message for said shuffling to the bulletin board.

13. The method of secure receipt-free voting of claim 8, wherein said proving the correctness of the shuffling is performed by executing the algorithm prove shuffle wherein the algorithm is performed by uniformly choosing c', c" and calculating $E(X_1) = (A_1 \cdot g^{c'} \bmod p, A_2 \cdot y^{c'} \bmod p)$ and $E(X_2) = (B_1 \cdot g^{c'} \bmod p, B_2 \cdot y^{c''} \bmod p)$ and posting $E(X_1)$ and $E(X_2)$ in order according to a committed string, then with probably ½ revealing c' and c" and checking if $E(X_1)$, $E(X_2)$ is consistent, then with probability ½, revealing $t_1 = c_1 - c'$ and $t_2 = c_2 - c"$ and checking that $E(X_1)$ and $E(X_2)$ can be generated from $S(X_1)$, $S(X_2)$ using $t_1$, $t_2$, g and y, wherein $S(X_1) = (A_1 g^{c1} \bmod p, A_2 \cdot y^{c1} \bmod p)$ and $S(X_2) = B_1 \cdot g^{c2} \bmod p, B_2 \cdot y^{c2} \bmod p)$, wherein encrypted shuffle votes $X_1 = (A_1, A_2)$ and $X_2 = (B_1, B_2)$.

14. An apparatus for secure receipt-free voting, the apparatus comprising:

a plurality of vote choosers;

at least one vote generating center, the at least one vote generating center constructing ballots for each vote chooser, each ballot having a value;

a bulletin board, the ballots being posted on the bulletin board, wherein the at least one vote generating center proves that the ballots are correctly constructed without generally revealing the values of the ballots and sends at least one private message to each of the vote choosers without the at least one private message being intercepted, the at least one private message revealing and proving to each vote chooser the values of the ballots from which that vote chooser may choose to vote, and wherein each vote chooser is permitted to create an alternative message based upon the at least one private message received by that vote chooser, the alternative message not being indicative of the correct values for the ballots revealed and proven to that vote chooser, wherein each vote chooser chooses a ballot from the revealed and constructed ballots indicative of a chosen vote, wherein proof of the value of the chosen ballot to a malicious party is prevented by rendering computationally infeasible a determination by the malicious party of whether the vote generating center sent the at least one private message actually received by the vote chooser or the alternative message, regardless of any information provided by the vote chooser to the malicious party at any time; and a vote counting center, wherein the vote chooser specifies the ballot chosen by the vote chooser to the vote counting center through a secure anonymous channel, and the vote counting center counts the ballots specified by all vote choosers to the vote counting center.

15. The apparatus for secure receipt-free voting of claim 14, further comprising:

said vote generating center committing a random string using chameleon commitment wherein for each bit, 0 or 1, the respective vote choosers know the value a satisfying $\alpha=g^a$ for public integer $\alpha$ and a 0-bit is committed by $g^r$ and a 1-bit is committed by $\alpha=g^r$;

proving the correctness of the vote construction using the committed bits; and decommiting through transmission without interception wherein decommiting is performed by revealing the value r and the vote chooser calculating both $g^r$ and $\alpha \cdot g^r$ and determining what was the committed bit.

16. The apparatus for secure receipt-free voting of claim 15, further comprising;

a shuffle net of shuffling centers for receiving said constructed ballots; and each shuffling center in the shuffle net shuffling the ballots and sending a private message to a vote chooser without being intercepted.

17. The apparatus for secure receipt-free voting of claim 14, further comprising:

a shuffle net of shuffling centers for receiving said constructed ballots; and each shuffling center in the shuffle net shuffling the ballots and sending a private message to a vote chooser without being intercepted.

18. The apparatus for secure receipt-free voting of claim 14, further comprising each shuffling center proving the correctness of its ballot construction.

19. The apparatus for secure receipt-free voting of claim 18, further comprising:

each shuffling center committing a random string using chameleon commitment wherein for each bit, 0 or 1, the respective vote choosers know the value a satisfying $\alpha=g^a$ for public integer $\alpha$ and a 0-bit is committed by $g^r$ and a 1-bit is committed by $\alpha \cdot g^r$ and proving the correctness of its ballot construction using the committed bits, and decommiting without being intercepted, wherein decommiting is performed by revealing the value r and the vote chooser calculating both $g^r$ and $\alpha \cdot g^r$ and determining what was the committed bit.

20. The apparatus for secure receipt-free voting of claim 19, further comprising each vote chooser invalidating the chameleon commitment.

21. The apparatus for secure receipt-free voting of claim 20, wherein each vote chooser invalidates the chameleon commitment by providing its secret key to said shuffling centers or to said bulletin board.

* * * * *